United States Patent [19]

Agarwal

[11] Patent Number: 5,752,072
[45] Date of Patent: May 12, 1998

[54] SORTING SCHEME WITHOUT COMPARE AND BRANCH INSTRUCTIONS

[75] Inventor: Ramesh Chandra Agarwal, Yorktown Heights, N.Y.

[73] Assignee: International Business Machines Corporation, Armonk, N.Y.

[21] Appl. No.: 644,753

[22] Filed: May 9, 1996

[51] Int. Cl.$^6$ .................. G06F 7/08; G06F 7/42
[52] U.S. Cl. .................. 395/800.34; 364/715.06; 395/800.36; 395/800.24
[58] Field of Search .................. 395/800, 99, 85, 395/602, 421.06, 675, 555, 800.16, 51, 186, 705, 800.34, 376, 800.32, 800.36; 364/167.01, DIG. 1, DIG. 2, 745.02, 709.05, 715.06; 327/113; 348/135, 155; 382/125, 209, 296, 156, 226

[56] References Cited

U.S. PATENT DOCUMENTS

| | | | |
|---|---|---|---|
| 3,727,078 | 4/1973 | Wollesen | 327/113 |
| 3,890,462 | 6/1975 | Limb et al. | 348/135 |
| 4,135,147 | 1/1979 | Riganati et al. | 382/125 |
| 5,121,494 | 6/1992 | Dias et al. | 395/602 |

OTHER PUBLICATIONS

"IEEE Standard for Binary Floating-Point Authentic", IEEE, Inc, N.Y. 1985 pp. 7–18.

*Primary Examiner*—Daniel H. Pan
*Attorney, Agent, or Firm*—Whitham, Curtis & Whitham; Stephen C. Kaufman

[57] ABSTRACT

A sorting scheme which does not require any compare or branch instructions is particularly useful for computers with multiple parallel functional units. Sorting two numbers or binary strings is performed using arithmetic instructions instead of conventional compare and branch instructions, thereby improving the performance of superscalar and very large instruction word (VLIW) computers. When applied to reduced instruction set computers (RISC), the sorting scheme provides better utilization of floating-point units. The sorting scheme allows floating point representation of data and floating-point instructions to sort binary strings.

9 Claims, 6 Drawing Sheets

SORTING SCHEME WITHOUT COMPARE AND BRANCH INSTRUCTIONS

DESCRIPTION

1. Field of the Invention

The present invention generally relates to sorting operations on computers with multiple parallel functional units and, more particularly, sorting two numbers or binary strings using arithmetic instructions instead of conventional compare and branch instructions, thereby improving the performance of superscalar and very large instruction word (VLIW) computers.

2. Background of the Invention

A very common computational step in many data processing applications is to order two numbers or binary strings (a,b), i.e., to arrange them in increasing sequence (c,d), where c=min(a,b) and d=max(a,b). This basic operation is found in many important applications such as sorting. Another related operation is to order their corresponding indices. Let ia and ib be the indices associated with a and b respectively. Then, it is desired to obtain indices ic and id where ic is the index of the smaller element and id is the index of the larger element. These computational steps can be expressed in Fortran as follows:

```
if (b.ge.a) then
    c=a
    d=b
    ic=ia
    id=ib
else
    c=b
    d=a
    ic=ib
    id=ia
endif
```

An implementation of the above code on a conventional machine requires compare and branch instructions.

An important trend in modern computer design is to incorporate multiple functional units which can work in parallel if there are no dependencies. This is to increase the overall performance of the machine. For example, in a very long instruction word (VLIW) computer, many independent instructions can be executed in parallel. Here, the key words are "independent instructions". The compare and branch instructions required in the above implementation of the sort kernel introduce dependencies and delays. Because of these delays and dependencies, a conventional implementation of the sort kernel can not fully exploit multiple functional units in modern computers.

Workstations are now widely used for solving complex engineering problems. These machines are designed to comply with ANSI/IEEE (American National Standard Institute/Institute of Electrical and Electronics Engineers) Standard 754-1985, "IEEE Standard for Binary Floating-Point Arithmetic", published by IEEE, Inc., New York, August 1985. These machines typically use RISC (for Reduced Instruction Set Computer) technology for increased computational speed. An example of one such workstation is described in *IBM RISC System/6000 Technology*, IBM product number SA23-2619 (1990).

Conventional sorting algorithms use compare and branch instructions which can be very slow on RISC machines with multiple functional units. RISC processors, like most superscalar processors of today, incorporate at least one independent fixed point unit (FXU) and at least one floating-point unit (FPU); however, the FPU is largely unused in conventional sorting algorithms. For general information on VLIW, superscalar and RISC machines, the reader is referred to *Superscalar Microprocessor Design*, by Mike Johnson, Prentice Hall (1991), and *High-Performance Computer Architecture*, Second Edition, by Harold S. Stone, Addison Wesley (1990).

SUMMARY OF THE INVENTION

It is therefore an object of the invention to provide a novel sorting scheme which does not require any compare or branch instructions.

It is another object of the invention to provide a method of using floating-point representation of data and floating-point instructions to sort binary strings.

According to the invention, two numbers or binary strings are ordered using arithmetic instructions instead of conventional compare and branch instructions. Since there are no dependencies, computers with multiple functional units, such as VLIW computer and some superscalar computer architectures, can perform the arithmetic instructions in parallel. In addition, the sorting scheme according to the invention provides better utilization of floating-point units (FPU) units in RISC and other superscalar computers by allowing floating point representation of data and floating point instructions to sort binary strings.

BRIEF DESCRIPTION OF THE DRAWINGS

The foregoing and other objects, aspects and advantages of the invention will be better understood from the following detailed description of the invention with reference to the accompanying drawings in which.

DESCRIPTION OF A PREFERRED EMBODIMENT OF THE INVENTION

Figure 1:
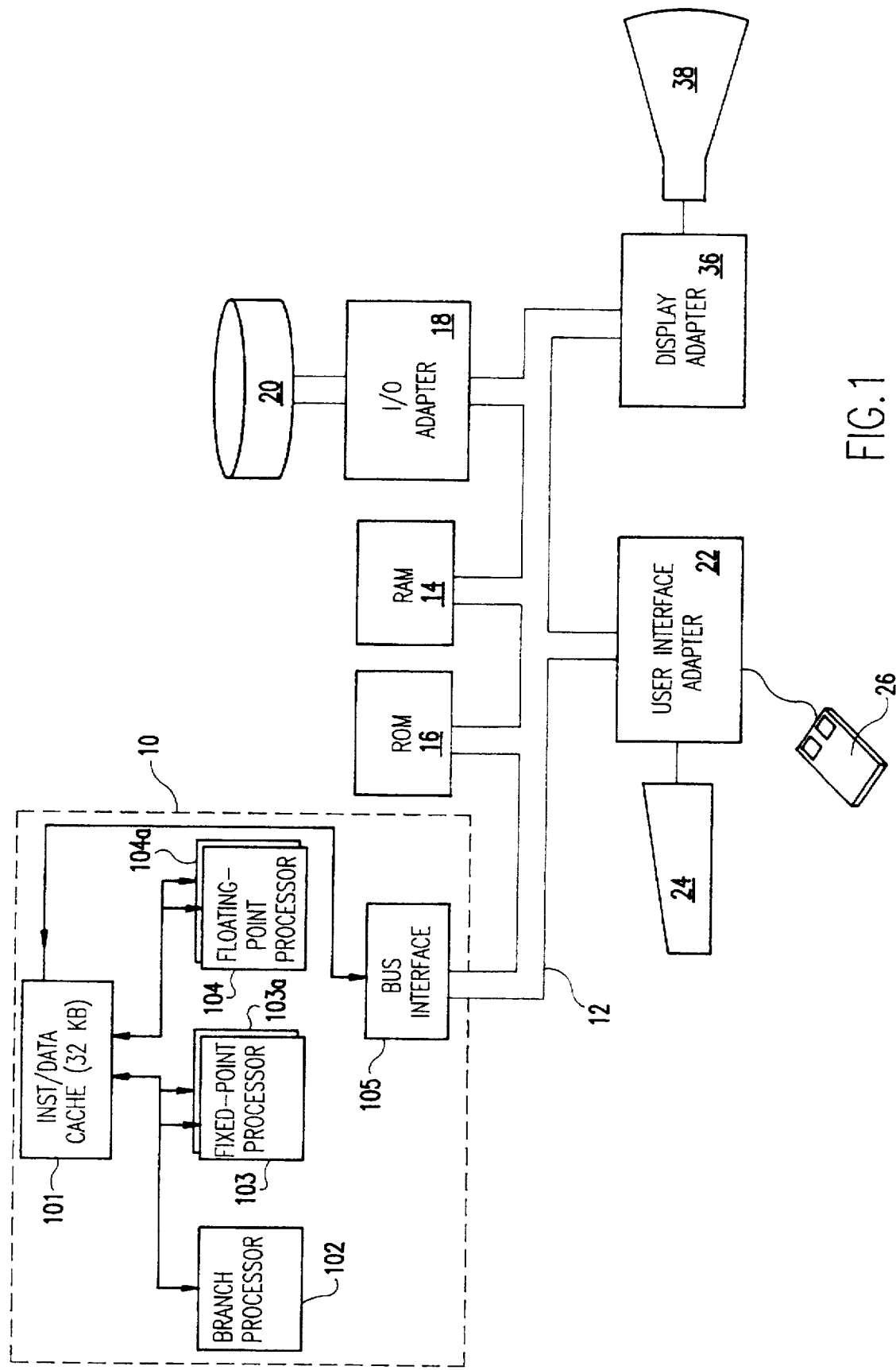
FIG. 1 is a block diagram showing a hardware configuration on which the subject invention may be implemented.

Referring now to the drawings, and more particularly to FIG. 1, there is shown a representative hardware environment on which the subject invention may be implemented. This hardware environment may be a workstation such as IBM's RS/6000 Workstations. The hardware includes a central processing unit (CPU) 10, which may be a RISC microprocessor such as IBM's PowerPC™ microprocessor as described in *The PowerPC™ Architecture: A Specification for a New Family of RISC Processors*, edited by Cathy May, Ed Silha, Rick Simpson and Hank Warren, Morgan Kaufmann Publishers (1994). In one example, the PowerPC™ 601 architecture is used in the RISC System/6000

Model 250 workstation. The instruction and data caches are combined as a single cache 101. The branch processor 102 executes only branch instructions from cache 101, but according to the present invention, the branch processor 102 is not used for sorting. The CPU 10 additionally has a fixed-point processor or integer unit (FXU) 103 and a floating-point processor or unit (FPU) 104 which execute instructions on data supplied by cache 101. The cache 101 communicates with the bus interface 105.

The CPU 10 is attached to a system bus 12 to which are attached a random access memory (RAM) 14, a read only memory (ROM) 16, an input/output (I/O) adapter 18, and a user interface adapter 22. The RAM 14 functions as main memory to the CPU 10 and provides temporary storage for application program code and data, while ROM 16 typically includes the basic input/output system (BIOS) code and may be implemented with flash, or electronically programmable, memory. The I/O adapter 18, such as a SCSI (for small computer system interface) adapter, is connected to one or more Direct Access Storage Devices (DASDs), here represented as a disk drive 20. The disk drive 20 typically stores the computer's operating system (OS), such as IBM's AIX™ operating system, and various application programs, each of which are selectively loaded into RAM 14 via the system bus 12. The user interface adapter 22 has attached to it a keyboard 24, a mouse 26, and/or other user interface devices such as a touch screen device (not shown). Such touch screen device would optionally be installed on the display 38, here represented as a cathode ray tube (CRT) display but which may be a liquid crystal display (LCD) or other suitable display device. The display 38 is connected to the system bus 12 via a display adapter 34.

First, there is provided a brief discussion of how to sort two numbers a and b. For the time being, it is assumed that the associated indices do not need to be sorted. Recall that all computers have an absolute (or abs) instruction which gives the absolute magnitude of the operand. Thus, abs(x)=x for x>0, and abs(x)=−x for x<0. This is a nonlinear instruction and can be used to avoid the compare and branch instructions. Thus, abs(b−a)=b−a if b>a, and abs(b−a)=a−b if b<a. This is true irrespective of the signs of a and b. The following terms are computed:

$e=a+b$ $f=abs(b-a)$ $c=e-f$ $d=e+f$

Now consider both the possibilities. Assume first that b>a. In that case, $f=abs(b-a)=b-a$ $c=e-f=(a+b)-(b-a)=2a=2\times min(a,b)$ $d=e+f=(a+b)+(b-a)=2b=2\times max(a,b)$ On the other hand, if b<a, then $f=abs(b-a)=a-b$ $c=e-f=(a+b)-(a-b)=2b=2\times min(a,b)$ $d=e+f=(a+b)+(a-b)=2a=2\times max(a,b)$ Thus, in both cases, (c,d) represent the ordered pair, except for a scale factor of two. This is true irrespective of the signs of a and b. The scale factor of two is not very important. If necessary, c and d can be scaled by 0.5, which represents a right shift by one position if numbers are integer variables. For floating point numbers, scaling can be accomplished by reducing the exponent by one. For an efficient implementation, it is best to define special add/subtract instructions which also scale down the result by a factor of two.

Figure 2:
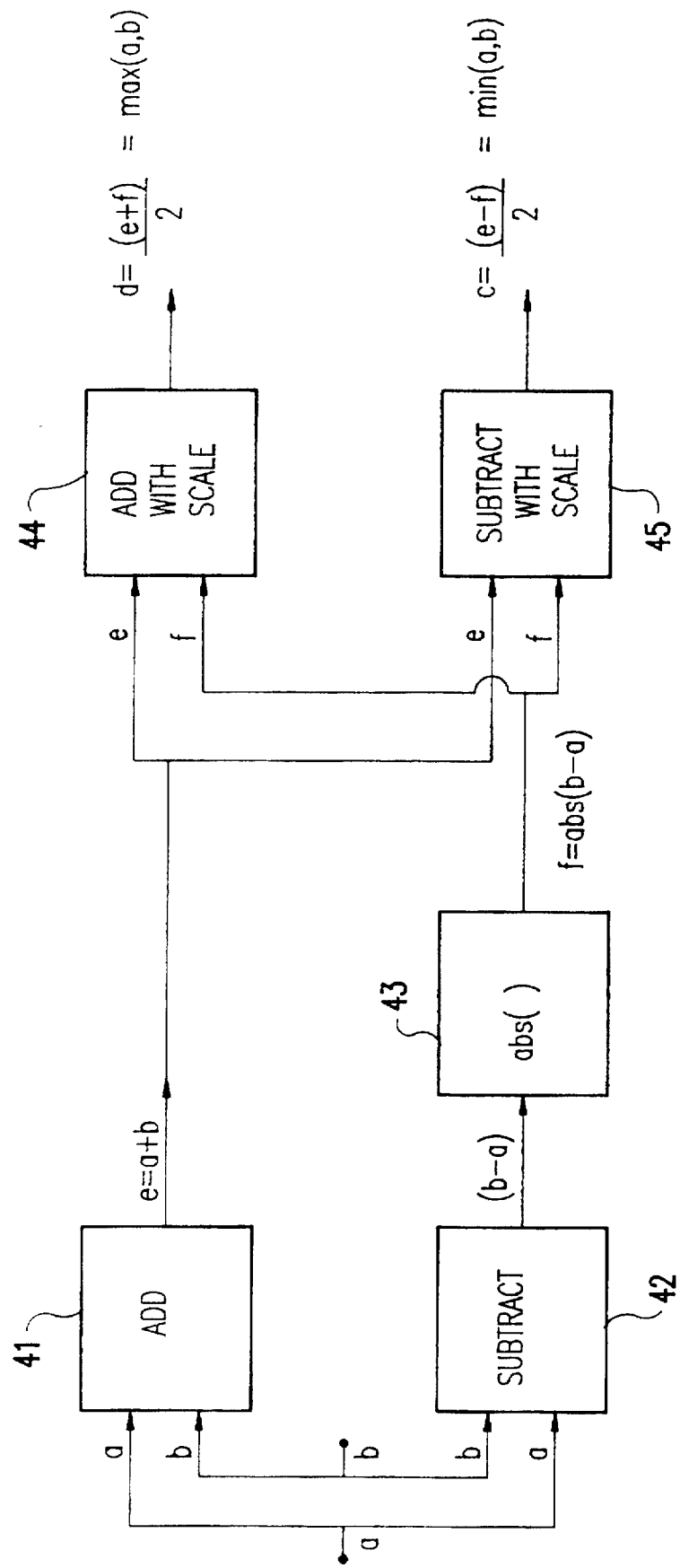
FIG. 2 is a flow diagram showing the logic of a computer implementation of the sort algorithm according to the invention.

The process is illustrated in the flow diagram of FIG. 2. Two numbers, a and b, are input to an adder 41 and a subtractor 42. The output, e, of adder 41 is the sum a+b. Meanwhile, the difference b−a is input to absolute value function 43 to produce the output, f, which is the absolute value of the difference, or abs(b−a). Now, the values e and f are input to adder 44 and subtractor 45. Besides performing sum and difference operations, both the adder 44 and the subtractor 45 scale their outputs. If performed in a fixed point unit, scaling is done by a right shift, but if performed in a floating point unit, scaling is done by reducing the exponent by one. Thus, the output, d, of the adder 44 is $$\frac{(e+f)}{2}=\max(a,b),$$

and the output, c, of subtractor 45 is $$\frac{(e-f)}{2}=\min(a,b).$$

The above implementation of the sort kernel does not require any compare and branch instructions. This allows for the possibility of unrolling a sort loop by a large factor. For example, a large number of sub-sequences can be sorted in parallel, using a large number of functional units in parallel, such as in a VLIW computer. Considering the superscalar architecture of the PowerPC™ CPU shown in FIG. 1, the POWER2 implementation of the RS/6000 workstation has a dual fixed point processor, represented by 103 and 103a, and a dual floating point processor, represented by 104 and 104a. With this implementation, the two parallel branches of the flow diagram shown in FIG. 2 can be executed in parallel using either the dual the FXU 103, 103a or the dual FPU 104, 104a.

Consider next, the case where the associated indices ia and ib need to be sorted to produce ic and id, as explained above. One way to implement this is to concatenate the data string with the index string. Thus, in a longer word, the high order bits are occupied by the data bits (binary string of a, the sort string or the key bits string) and the low order bits are occupied by the corresponding index bits (binary bits of ia). In this "extended word" representation, when a and b are sorted using the algorithm given above, the index bits always remain with the sort bits. The binary string for c and d will contain the corresponding index bits (for ic and id, respectively).

In sorting algorithms, in case of a tie (i.e., a=b), it is usually desired that they be sorted by their indices. Thus, if ia<ib, then c should equal a and d should equal b, and if ia>ib, then c should equal b and d should equal a. The algorithm given above preserves this important ordering in case of a tie. This is always true for positive numbers. However, for negative numbers, it is true if a and be are represented in two's complement arithmetic, as is the case for most machines.

An important trend in modern computers, particularly as represented by the PowerPC™ family of microprocessors, is to adopt 64-bit addressing, and thus 64-bit integer operations. This makes it easy to concatenate key bits with the index bits. Depending on the range of indices, a fixed number of low order bits can be used for storing the indices and the remaining high order bits can be used to store the key bits. Because the index bits occupy low order bits, they do not play any role in sorting unless there is a tie. This scheme reduces the number of instructions also by approximately a factor of two, because indices are not handled separately. They are always a part of the data.

Currently, most computers have a 32-bit integer unit (FXU) and a 64-bit floating point unit (FPU). On machines like the IBM's RS/6000 workstation, as illustrated in FIG. 1, the FXU 103 is used for 32-bit arithmetic operations as well as for load/store of all kinds of data. In sorting binary data, using the current algorithms, the FPU 104 remains largely unutilized. By storing binary data as a long precision floating point number, it is possible to utilize the FPU 104. As an additional benefit, more binary bits can be sorted at one time. Additionally, the index information can be packed as part of the floating point data. Here is how it can be done.

Figure 3:
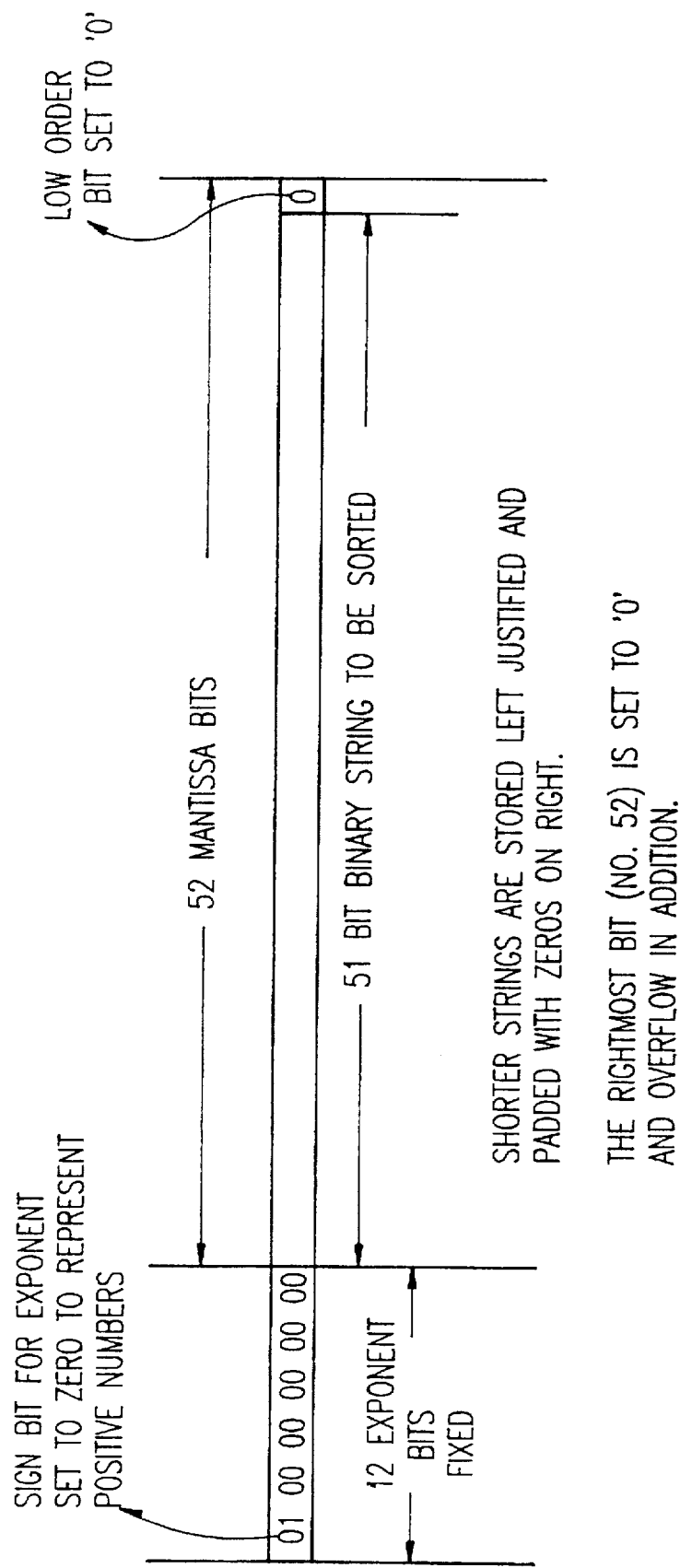
FIG. 3 is a graphical representation of the use of 64-bit IEEE floating point format to sort binary strings up to 51 bits long.

For illustration, see FIG. 3. The 64-bit IEEE floating-point format is assumed. Most machines have adopted this format. The high order twelve bits consist of the sign and exponent bits and the remaining fifty-two bits are used for mantissa and an implied "1" bit as the fifty-third (high order) bit of the mantissa. For simplicity, an exponent of "0" and a positive sign are assumed. Now. fifty-two mantissa bits are available for the binary string to be compared. If index information is not to be packed as part of the word, then fifty-one of these bits can be used to store the binary comparison strings. The low order bit is set to zero. This is necessary to make sure that when two numbers (having the same exponent and sign) are added, then the addition is performed without any round off error. Thus, I make sure that c and d, computed according to the algorithm given in this invention, truly correspond to the original binary strings. Using the conventional algorithm and 32-bit integer arithmetic, only thirty-two bits can be sorted at a time. Using the floating-point representation, fifty-one bits can be sorted at a time. Furthermore, in this implementation, FPU 104 and FXU 103 complement each other very well. The FXU 103 is used to load/store the data while the FPU 104 is being used to sort the data, via floating-point arithmetic instructions. This results in a nice functional unit balance. Normally, sorting algorithms do not use the FPU 104. Using this invention, sorting performance can be improved many fold.

Figure 4:
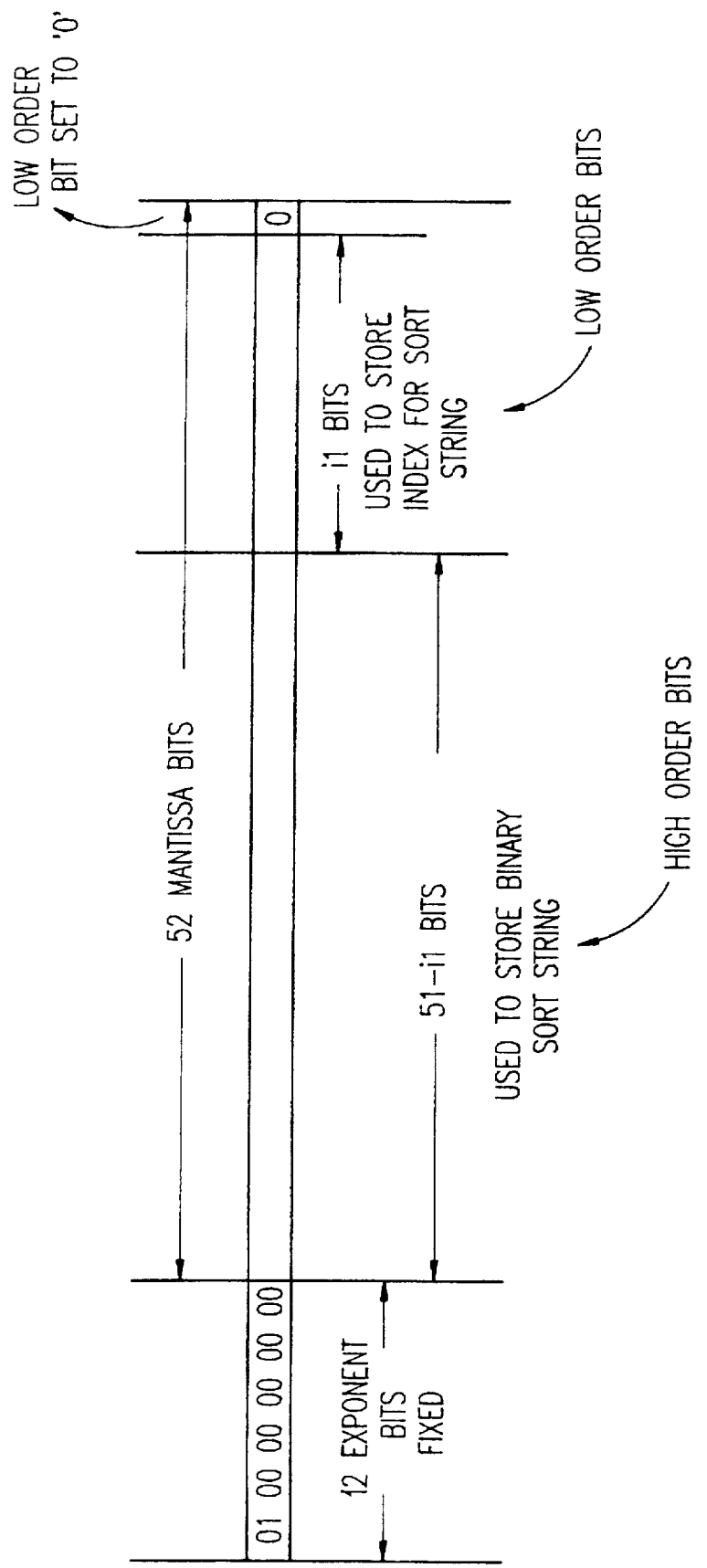
FIG. 4 is a graphical representation of a scheme to append index along with string to be sorted in a 64-bit IEEE floating point number.

If it is desired to sort indices along with binary strings, then index information can also be packed as part of the floating point word, using a scheme similar to the one described above, as illustrated in FIG. 4. Assume that i1 bits are needed to represent the index information. Then, in the 52-bit mantissa, high order (51-i1) bits are used to store the binary sort string, the next i1 bits are used to store the index, and the last bit is set to zero (as explained above). Because the index bits occupy the low order bits, they do not interfere in the sorting process. On the other hand, they are very useful in resolving the ties. When, the binary strings are identical, sorting is done on the basis of the index. The string having the lower index will be assigned to c and the one having the higher index will be assigned to d. This kind of ordering is in fact desired for the case of ties.

Figure 5:
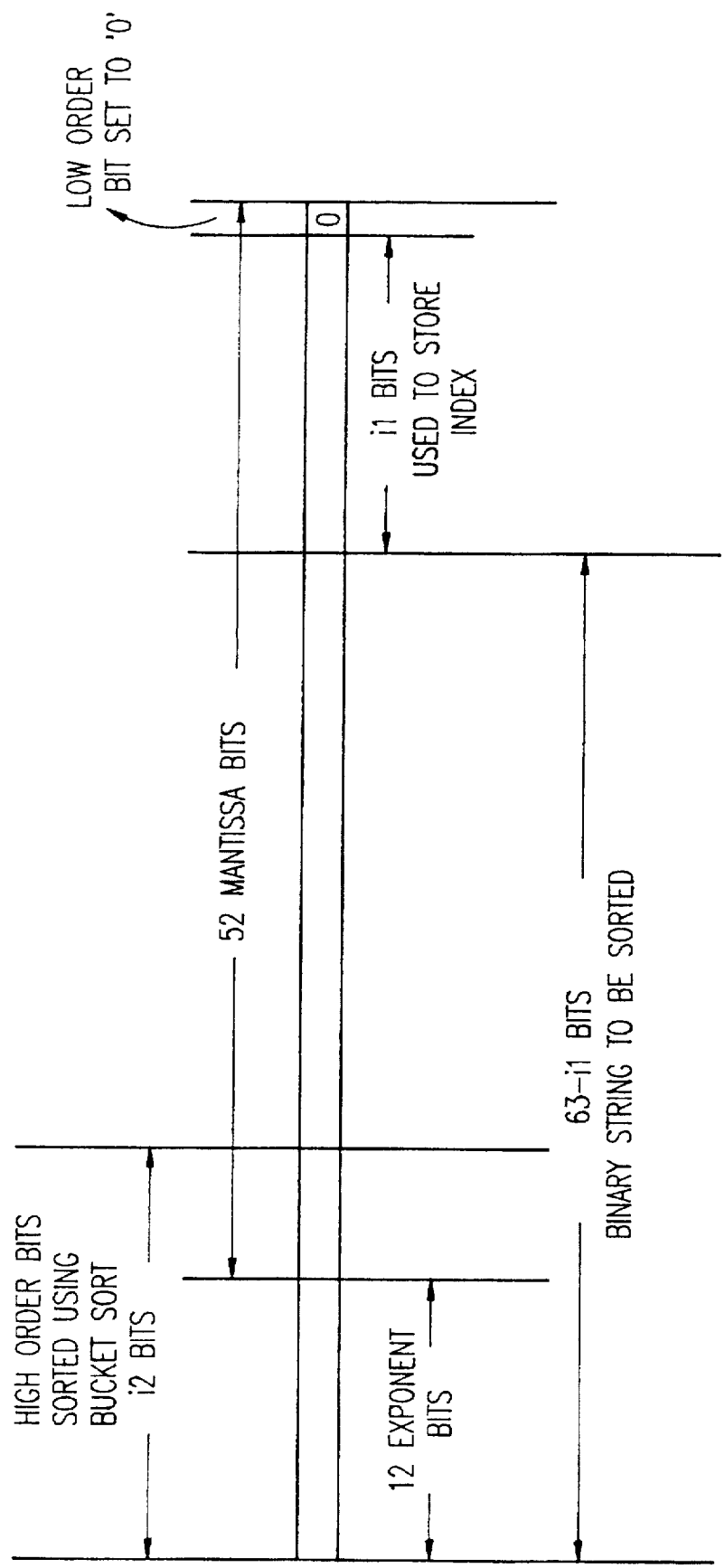
FIG. 5 is a graphical representation of a scheme which combines bucket sorting so as to sort longer key strings (up to 63-i1 bits)

In many sorting situations, it is often desirable (for memory system locality) to do initial bucket sorting on high order bits. This takes a large data set and splits the data set into many buckets wherein further sorting is done only within individual buckets, thus providing better data locality (i.e., cache utilization). Referring now to FIG. 5, assume that i2, greater than or equal to 12, high order bits are sorted using conventional floating point representations of data. In this case, the binary sort string can be up to (63-i1) bits long and occupies both exponent bits as well as part of the mantissa bits. During bucket sorting, all strings having the same high order i2-bit pattern are stored in the same bucket. Thus, there are $2^{i2}$ different buckets. Within a bucket, all strings will have identical exponent bits, and (i2-12) mantissa bits will also be identical. This step is followed by sorting data within a bucket, where all elements have the same exponent. This additional sorting is done using arithmetical instructions, as described above. Now, there is a slight complication. Although all strings have the same exponent bits, for half the buckets (where the leading bit is "1"), the floating point representation will have a negative sign. This will require a slight adjustment to the algorithm. Also, for the extreme buckets, corresponding to the largest or smallest exponents, there is a possibility of an overflow or an underflow. To avoid all these complications, after bucket sorting, it is best to replace the exponent bits by "010000000000", as in FIG. 3. This corresponds to a positive sign and an exponent of zero. By using this combined technique, twelve additional bits are now available for sorting. As an example, forty 3-bit strings can be sorted if a 20-bit (i1) index is used; 43+20=63. Note that the last bit must always be zero. If i2>12, then bucket sorting spills into the mantissa bits.

Figure 6:
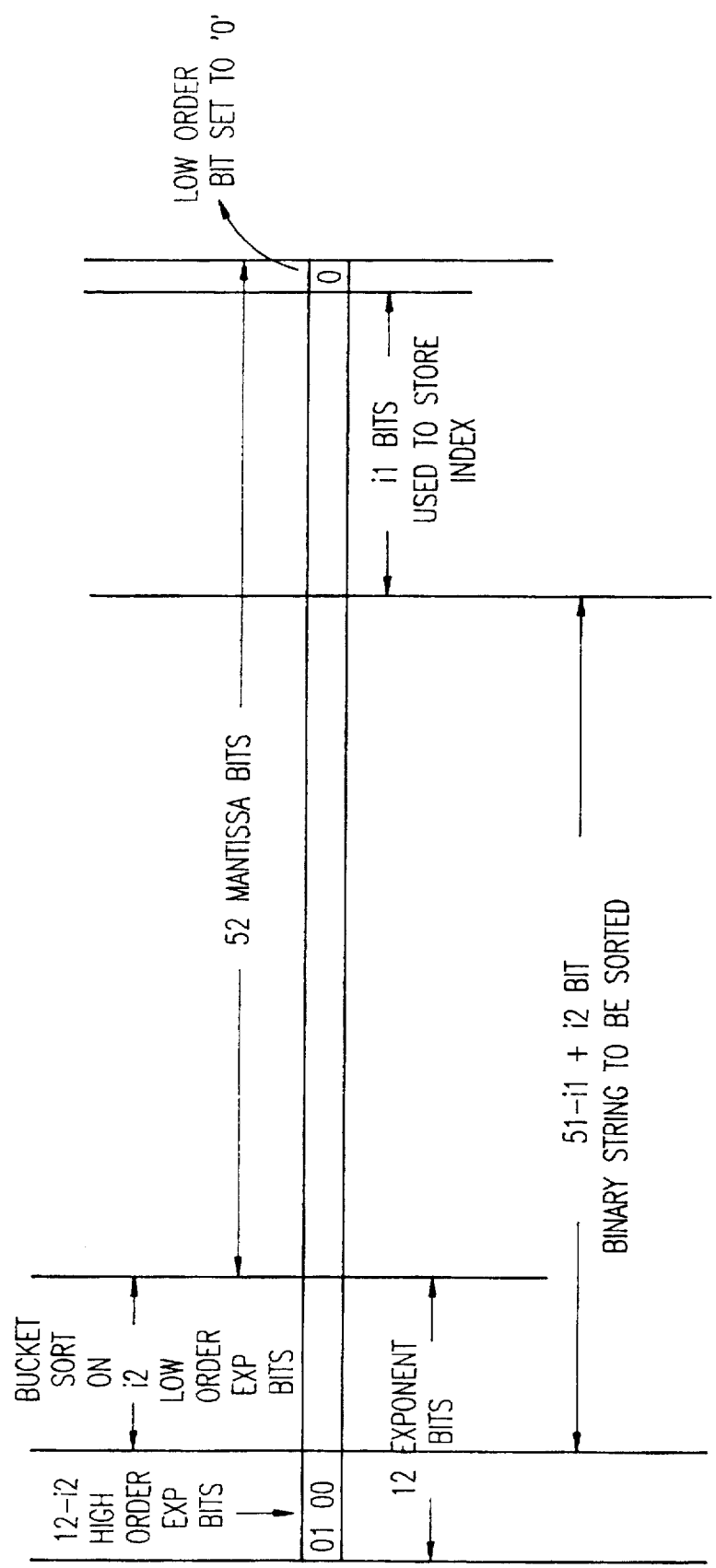
FIG. 6 is a graphical representation of a modification of the scheme shown in FIG. 5 which uses a fewer number of bits for bucket sorting.

The number of high order bits used for bucket sorting is usually decided based on the memory system considerations. The above scheme assumes bucket sorting on at least twelve high order bits. If it is desired to use fewer number of bits for bucket sorting, then the scheme can be modified as shown in FIG. 6. As an example, consider i2=8. The four high order exponent bits are set to "0100", the binary sort string is stored immediately after these four high order exponent bits. These high order eight bits are sorted using a bucket sort. This assumes that all strings in a bucket have identical exponents. Furthermore, for this example, after bucket sorting, it is not necessary to change the exponent bits. For this example, the floating point number representation has a positive sign and there is no possibility of an overflow or an underflow. Using this scheme, i2 additional bits are available for sorting, and if i2 is no more than nine, then after bucket sorting, there is no need to change the exponent bits. Depending on the number of bits used for bucket sorting, the schemes illustrated in FIGS. 5 and 6 can be used to sort longer binary strings.

While the invention has been described in terms of preferred embodiments, those skilled in the art will recognize that the invention can be practiced with modification within the scope of the claims.

Having thus described my invention, what I claim as new and desired to secure by Letters Patent is as follows:

1. A computer implemented method of sorting without compare and branch instructions in a computer having multiple parallel functional units comprising the steps of:

in a first functional unit, inputting two numbers, a and b, and computing an output, e, as a sum a+b;

in a second functional unit, inputting said two numbers, a and b, and computing an output as a difference b−a;

in said second functional unit, computing an output, f, which is the absolute value of the difference, or abs(b−a); and inputting the values e and f to each of said first and second functional units and, in said first functional unit, computing a output, d, as $$\frac{(e+f)}{2} = \max(a,b),$$

and in said second functional unit, computing a output, c, as $$\frac{(e-f)}{2} = \min(a,b).$$

2. The computer implemented method recited in claim 1 wherein said first and second functional units are the same unit, the computation of a+b and abs(b−a) being performed in sequence.

3. The computer implemented method recited in claim 1 wherein said first and second functional units are a floating point processor and said numbers a and b are represented by binary strings of mantissas of a floating point number with an exponent of zero and a positive sign, a fixed point processor of the computer being used for load/store instructions while the floating point processor sorts data.

4. The computer implemented method recited in claim 1 wherein the computer is a very long instruction word (VLIW) computer having a plurality of identical functional units, the computation of a+b and abs(b−a) being performed in parallel in identical functional units.

5. The computer implemented method recited in claim 1 wherein the computer is a superscalar computer with multiple fixed point functional units and multiple floating point functional units, the computation of a+b and abs(b−a) being performed in parallel in one of said multiple fixed point or said multiple floating point functional units.

6. The computer implemented method recited in claim 5 wherein the computation of a+b and abs(b−a) is performed in parallel in said multiple floating point functional units and said numbers a and b are represented by binary strings of mantissas of a floating point number with an exponent of zero and a positive sign, said multiple fixed point functional units of the computer being used for load/store instructions.

7. The computer implemented method of claim 1 wherein said first and second functional units are a floating point processor and said numbers a and b are represented by binary strings of mantissas of a floating point number with an exponent of zero and a positive sign and index bits ia and ib for said numbers a and b, respectively, are concatenated with the binary strings, a fixed point processor of the computer being used for load/store instructions while the floating point processor sorts data.

8. The computer implemented method of claim 1 wherein first and second functional units are a floating point processor and said numbers a and b are represented by binary strings of mantissas of a floating point number further comprising the steps of:

performing a bucket sort of all binary strings having a same exponent; and after the bucket sort, setting an exponent to zero and setting a sign to positive.

9. The computer implemented method of claim 8 wherein index bits ia and ib for said numbers a and b, respectively, are concatenated with the binary strings.

* * * * *